US006829667B2

(12) United States Patent
Nagalkar

(10) Patent No.: US 6,829,667 B2
(45) Date of Patent: Dec. 7, 2004

(54) METHOD AND SYSTEM FOR IMPROVED PROCESSING OF CPU INTENSIVE COMMUNICATIONS PROTOCOLS BY DISABLING PER FRAME INTERRUPTS FOR AN INTERRUPT PERIOD

(75) Inventor: Dhananjay A. Nagalkar, Randolph, NJ (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 09/951,538

(22) Filed: Sep. 14, 2001

(65) Prior Publication Data

US 2003/0056046 A1 Mar. 20, 2003

(51) Int. Cl.[7] ............................. G06F 9/48; G06F 13/00
(52) U.S. Cl. ........................ 710/260; 710/105; 710/52; 370/912
(58) Field of Search ................................. 710/260–269, 710/52, 56, 48, 105; 709/236; 712/32; 370/403, 912

(56) References Cited

U.S. PATENT DOCUMENTS 4,959,781 A * 9/1990 Rubinstein et al. ......... 710/262
5,740,451 A * 4/1998 Muraki et al. .............. 710/260
6,092,160 A * 7/2000 Marsters ..................... 711/156

OTHER PUBLICATIONS

"Design and implementation of interrupt packaging mechanism" by Nakashima, K. ; Kusakabe, S. ; Taniguchi, H. and Amamiya M (abstract only).*
"Resource management of the OS network subsystem" by Ghosh, S and Rajkumar, R. R. (abstract only).*

* cited by examiner

Primary Examiner—Gopal C. Ray
(74) Attorney, Agent, or Firm—Pillsbury Winthrop LLP

(57) ABSTRACT

A method of processing a frame of a CPU intensive communications protocol includes disabling per frame interrupts of a CPU; enabling a periodic interrupt handler to interrupt the CPU upon an interrupt period; and upon an interrupt of the periodic interrupt handler, determining and processing a frame received in the interrupt period. Further, a frame sent acknowledgment stored in the interrupt period may be processed during the interrupt. A method of processing the transmission of frames of a CPU intensive communications protocol includes, when no MSU frame is queued for transmission, sending FISU frames that each point to itself; and if a MSU frame is queued for transmission, updating the MSU frame to point to a new FISU frame, updating a current FISU frame to point to the MSU frame, and sending the current FISU frame, the MSU frame and the new FISU frame.

14 Claims, 7 Drawing Sheets

METHOD AND SYSTEM FOR IMPROVED PROCESSING OF CPU INTENSIVE COMMUNICATIONS PROTOCOLS BY DISABLING PER FRAME INTERRUPTS FOR AN INTERRUPT PERIOD

BACKGROUND

1. Field of the Invention

This invention relates in general to the field of central processor unit (CPU) intensive communication protocols. Particularly, this invention pertains to achieving increased instances of protocol processing for CPU intensive communications protocols.

2. General Background and Related Art

Communications systems employing modern digital communications protocols convey information in the form of messages, frames and/or packets made up of digital data. Each such message, frame and/or packet comprises various fields containing control information, message data, etc. relevant to an appropriate layer in the Open Systems Interconnection (OSI) model—a standard reference model describing the layers of a network and the types of functions expected at each layer. For example, at Layer 1 or the physical layer information is transmitted in the form of frames made up of bits; packets comprising one or more frames of fields and data are transmitted at Layer 2 or the data link layer in the OSI model; and messages comprising one or more packets of fields and data are transmitted at Layer 3 or the network layer in the OSI model. The final processing of one or more messages, frames and/or packets result in one or more messages for use by higher layers in the OSI model.

In a typical communications system, each frame receipt and transmission has to be processed by a specialized protocol processing device. The frame information is conveyed to the main CPU core by generating an interrupt. The CPU core stops its normal processing and services on occurrence of the interrupt, takes care of the protocol condition and then resumes normal processing and services. Thus the transmission and reception of data frames results in interrupts of the CPU for each frame sent or received. For some CPU intensive networking protocols such as the Signaling System 7 (SS7) protocol, data in the form of frames comes in continuously and places a high demand on a CPU to process the data by interrupting the CPU for every frame received or transmitted. Typically, some of those protocols maintain a communication channel open by sending frames continuously to monitor the integrity of a signaling link, such as Link Status Signaling Units (LSSUs) which are used to bring a link into alignment as part of the SS7 protocol. Also, some protocols send idle frames when there is no data to transmit such as Fill In Signaling Units (FISUs) sent as part of the SS7 protocol. These FISUs are 6 byte signal units that comprise, among other things, the sequence numbers denoting the last valid frame received/transmitted and the next frame to be transmitted. Each FISU and LSSU has to be processed the same way as frames containing message data thereby taxing the CPU's processing capabilities. Moreover, FISUs and LSSUs often don't contain any new information thereby making CPU processing redundant.

Consequently, even the most powerful CPU often gets overloaded trying to service such processing intensive communications protocols such as SS7. This overloading of a CPU often limits the number of data links the CPU can support. For this reason, very few data channels (typically 3–16 channels) running such processing intensive protocols can be supported by traditional systems. In the present state-of-art, there appear to be no single board solutions for the SS7 protocol servicing 64–128 channel signaling data links.

Accordingly, there is a need in the art for a solution to achieving increased instances of protocol processing for CPU intensive communications protocols, preferably utilizing existing hardware components. Therefore, it is advantageous to provide a method and system for improved processing of CPU intensive communications protocols.

BRIEF DESCRIPTION OF THE DRAWINGS

The embodiments of the present invention are illustrated by way of example and not limitation in the figures of the accompanying drawings in which like references indicate similar or corresponding elements and in which.

DETAILED DESCRIPTION

A method and system for improved processing of CPU intensive protocols is provided. In an embodiment of the invention, a method of processing a frame of a CPU intensive communications protocol, comprises disabling per frame interrupts of a CPU; enabling a periodic interrupt handler to interrupt the CPU upon an interrupt period; and upon an interrupt of the periodic interrupt handler, determining and processing a frame received in the interrupt period. Further, upon an interrupt of the periodic interrupt handler, the method of processing a frame of a CPU intensive communications protocol may determine and process a frame sent acknowledgment stored in the interrupt period. According to another embodiment of the invention, a method of processing the transmission of frames of a CPU intensive communications protocol, comprises, while no MSU frame is queued for transmission, sending FISU frames that each point to itself; and if a MSU frame is queued for transmission, updating the MSU frame to point to a new FISU frame, updating a current FISU frame to point to the MSU frame, and sending the current FISU frame, the MSU frame and the new FISU frame.

Figure 1:
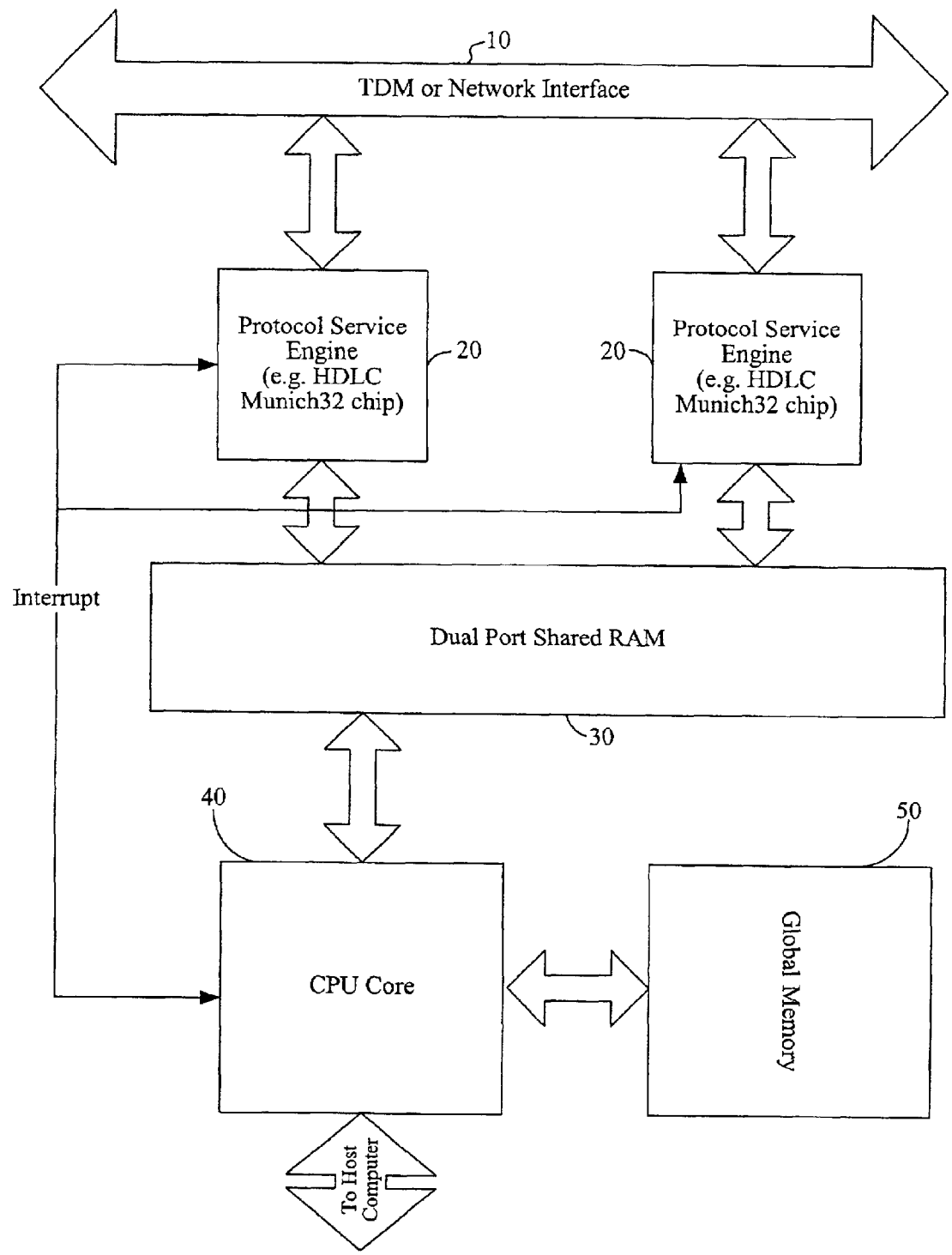
FIG. 1 illustrates a hardware architecture in which an embodiment of the invention may be implemented.

Referring to FIG. 1, a hardware architecture in which an embodiment of the present invention may be implemented is shown. A network interface or TDM adapter (time division multiplexing terminal adapter which is a protocol converter device that allows analog voice and data devices to operate through an E1/T1, DS3, etc. connection) data stream 10 provides the input digital stream to one or more protocol service engines (PSEs) 20. As will be apparent to those skilled in the art, any type of communication device could provide the necessary data stream to the PSEs. The PSE comprises a generic high level data link controller (HDLC) although as will be apparent to those skilled in the art the HDLC could be any other communication device for transmitting and receiving frames. This controller performs the physical layer functionality of the protocol and provides the frames to the CPU core 40. Among other things, the PSEs provide typical Layer 1 (physical layer in the OSI model) integrity checks and make sure the frames are received correctly. A PSE also typically is driven by the CPU and interrupts the CPU on receipt of a frame. In an embodiment of the invention, the protocol service engines comprise Siemens Munich32 HDLC chips.

Dual port shared RAM 30 is used to share the data in the form of frames between the CPU core and the PSEs on the receipt of frames. PSEs store the frames in the shared RAM and then interrupt the CPU core to request the processing of the frames. Similarly, the CPU core also stores frames for transmission in the shared RAM which stored frames the PSE transmits. The CPU core could be any type of microprocessor known to those skilled in the art. The CPU core when interrupted picks up incoming frames processed by the PSEs (and stored by the PSEs in buffers in the shared RAM) from the shared RAM and transfers that data to global memory 50 for processing by the CPU core (or any other relevant processors). When data is sent outbound (i.e. transmit instead of receive), the CPU core places the data to be transmitted in shared RAM buffers and then triggers the PSEs to process the data. When the PSEs have completed processing, the data in the form of frames is sent out into the network interface or TDM adapter data stream. As should be well-known to those in the art, other configurations of memory and interrupts are possible.

Referring to FIGS. 2 to 6, an embodiment of the present invention for improved processing of CPU intensive communications protocols is depicted in the form of high-level flow diagrams. An embodiment of the present invention is implemented as firmware for operation on the CPU and for use with a PSE, particularly to modify the operation of a HDLC of the PSE and for use with the SS7 protocol. As should be well-known to those in the art, an embodiment of the invention could also be implemented as hardware or as firmware/software for use in an appropriate PSE. Additionally, an implementation allows for the enabling and disabling of the improved processing as well as the adjustment of parameters to configure the processing.

Figure 2:
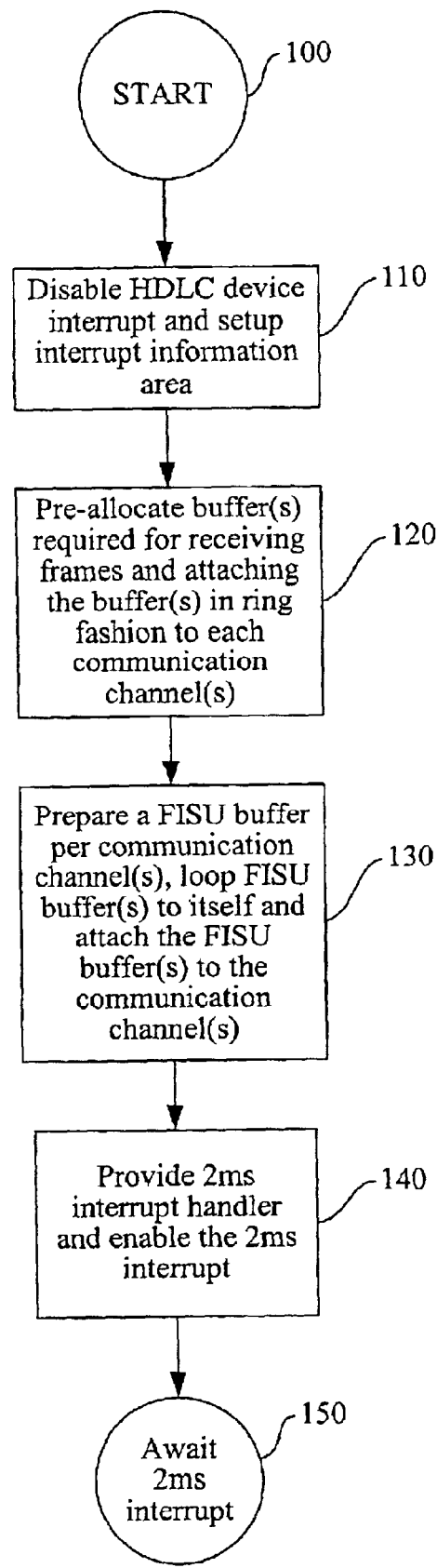
FIG. 2 is a flow diagram illustrating establishing an interrupt for improved processing of the receipt of CPU intensive communications protocol frames and acknowledgments of CPU intensive communications protocol frames according to an embodiment of the present invention.

Referring to FIG. 2, establishing an interrupt for improved processing of the receipt of CPU intensive communications protocol frames and acknowledgments of CPU intensive communications protocol frames according to an embodiment of the present invention is illustrated as a high-level flow diagram. To reduce the load on a CPU due to the potentially "continuous" streams of FISU and/or LSSU frames being received, the HDLC per frame interrupt of the CPU is disabled in the PSE and an interrupt information area is set-up for the periodic 2 ms interrupt handler of the present invention 110. The interrupt information area comprises information related to the 2 ms interrupts including pointers to buffers where frames are stored for transmission and/or receipt. Further, buffers required for receiving frames are pre-allocated and are attached in ring fashion to each communication channel handled by the PSE 120. FISU buffers are prepared for each communication channel handled by the PSE, are looped to themselves (see below in regard to e.g. FIG. 7 for more detail) and attached to each communication channel 130. Lastly, a periodic 2 ms interrupt handler is provided and enabled whereupon all the frames are processed (polled) at every 2 ms interval 140. Once the 2 ms interrupt handler is provided and enabled, a 2 ms interrupt is awaited 150. As should be apparent to those in the art, other interrupt times may be used as appropriate to the protocol and hardware architecture in which an embodiment of the invention is applied. Instead of interrupting the CPU for every frame, the CPU is interrupted only every 2 ms thereby significantly reducing the load on a CPU where the communication protocol makes intensive use of the CPU e.g. interruptions of less than every 2 ms. While the HDLC per frame interrupt of the CPU is disabled, the HDLC still generates interrupt entries for each frame received.

Figure 3:
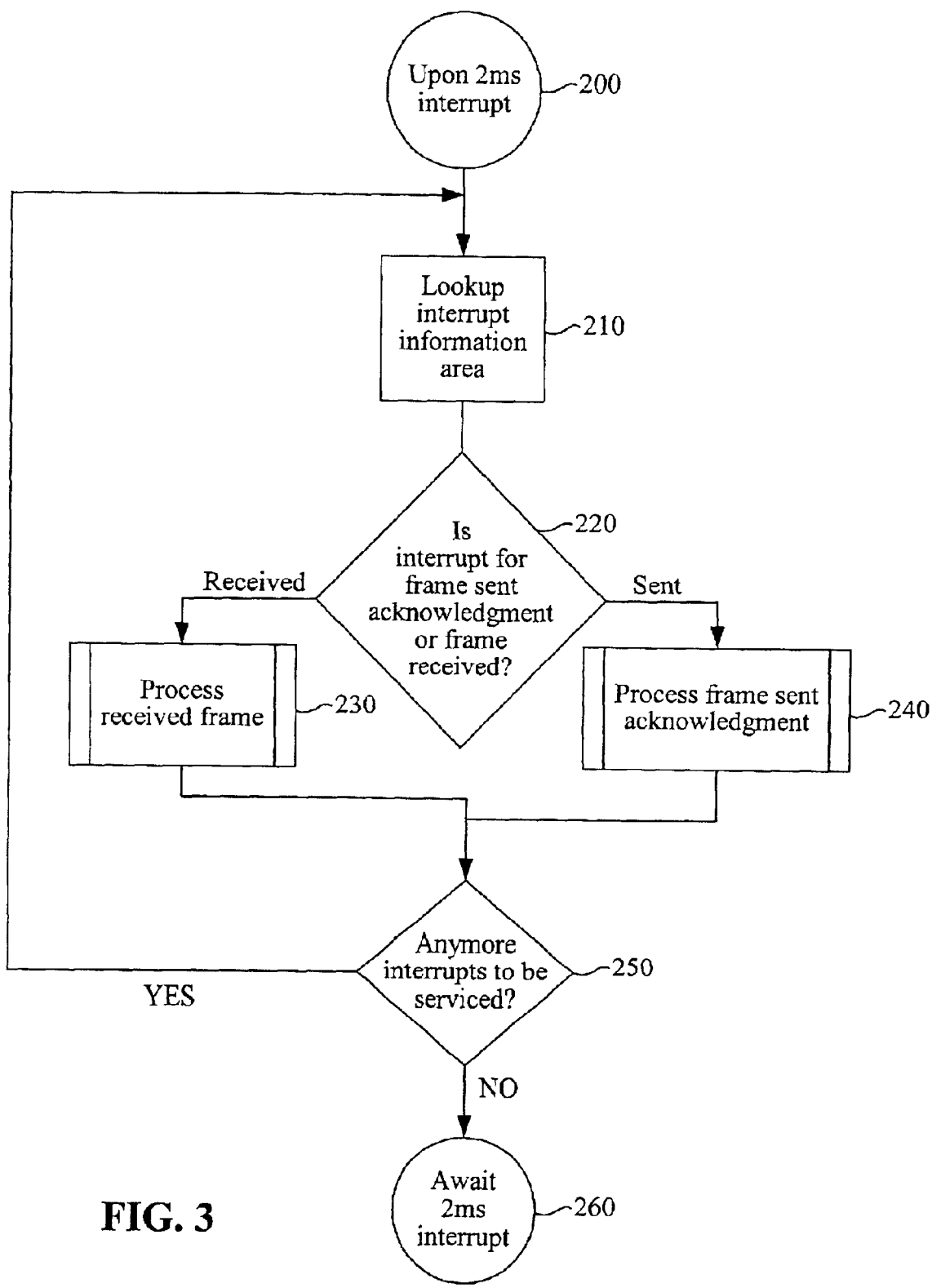
FIG. 3 is a flow diagram illustrating general processing, upon an interrupt, the receipt of CPU intensive communications protocol frames and acknowledgments of CPU intensive communications protocol frames according to an embodiment of the present invention.

Referring to FIG. 3, upon a 2 ms interrupt 200, the CPU looks up information in the interrupt information area 210 to determine frames received and frame sent acknowledgments to be processed, in the 2 ms period, that are stored in the buffer(s) along with their descriptors, pointers for which are logged as interrupt entries. In short, the CPU runs through the interrupt queue entries, dereferences the interrupt entry pointers to the received frames and frame sent acknowledgment frames in the buffer(s) and then analyzes each such descriptor and associated frame. If the interrupt is for a received frame, then the received frame is processed 230 (as described in more detail below). If the interrupt is for a frame sent acknowledgment frame then the frame sent acknowledgement frame is processed 240 (as described in more detail below). After each such frame is processed, if more interrupts are to be serviced 250 the above-described look-up and analysis is repeated for each such interrupt. If no more interrupts are to be serviced, another 2 ms interrupt is awaited 260 (and upon a 2 ms interrupt 200 the foregoing is repeated as long as the PSE and CPU are in operation and/or the link(s) remain open). In an optimized implementation, the CPU would send a single message to a higher layer application for all the interrupt entries logged in the 2 ms interrupt period which require after processing 230, 240 data to be sent to such a higher layer application.

Figure 4:
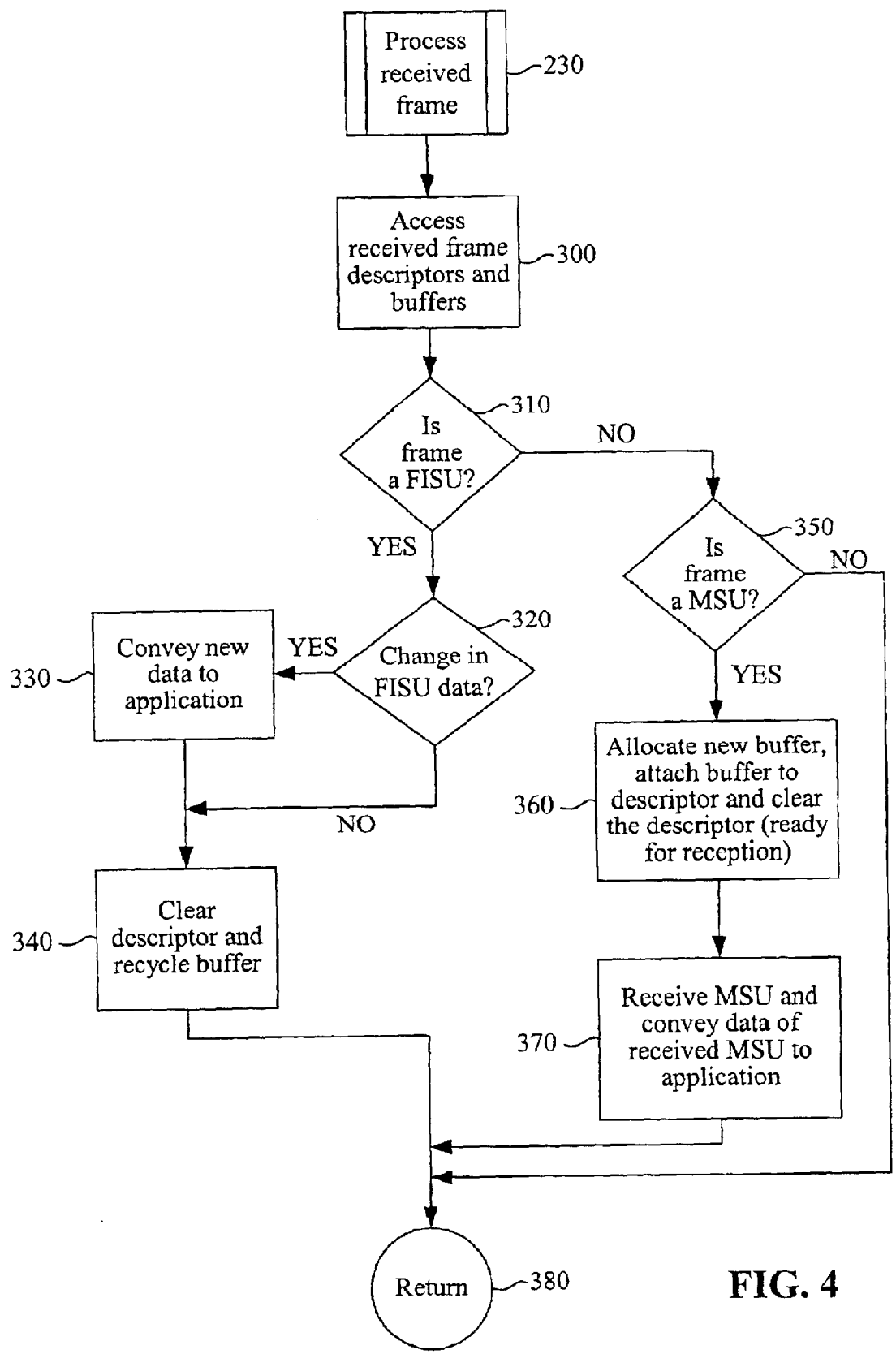
FIG. 4 is a flow diagram illustrating processing received CPU intensive communications protocol frames according to an embodiment of the present invention.

Referring to FIG. 4, the processing of received frames according to an embodiment of the present invention is illustrated as a high-level flow diagram and comprises determining duplicate FISU and LSSU frames in the received frames. If either a FISU or LSSU frame is a duplicate, its respective descriptor is freed and is ready to be used by, for example, the HDLC. So, processing a received frame 230 comprises accessing the received frame descriptor(s) and associated buffer(s) 300 to obtain information regarding the received frame. If the received frame is a FISU or LSSU 310, the received FISU or LSSU is analyzed to determine whether there has been a change in the FISU or LSSU data from previous FISUs or LSSUs 320. If there is a change in data, a pointer to the data buffer associated with the descriptor for the FISU or LSSU is sent to the CPU's Message Handler task whereupon the Message Handler task retrieves the message(s) from the data buffer pointed to by the pointer and sends the message(s) to a higher layer application using standard messaging functions (such as DM3) 330. Once the message(s) is sent or if there was no change in the data of the FISU or LSSU, the descriptor is then marked free (to which a new data buffer may be associated) and the relevant data buffer(s) is freed up and may be used by the HDLC or the CPU 340. The processing then returns 380 to the look-up and analysis of interrupts as described above.

If the received frame is not a FISU or LSSU, it is next determined 350 if the received frame is a Message Signaling Unit (MSU), a frame comprising actual message data. If the frame is not a MSU then the processing returns 380 to the look-up and analysis of interrupts as described above for error handling, if required (not shown). If the received frame is a MSU, a new buffer is allocated, the new buffer is associated with the MSU descriptor and the descriptor is then marked free and may be used by the HDLC or the CPU 360. A pointer to the data buffer associated with the descriptor for the MSU is sent to the CPU's Message Handler task whereupon the Message Handler task retrieves the message(s) from the data buffer pointed to by the pointer and sends the message(s) to a higher layer application using standard messaging functions (such as DM3) 370. The processing then returns 380 to the look-up and analysis of interrupts as described above.

Figure 5:
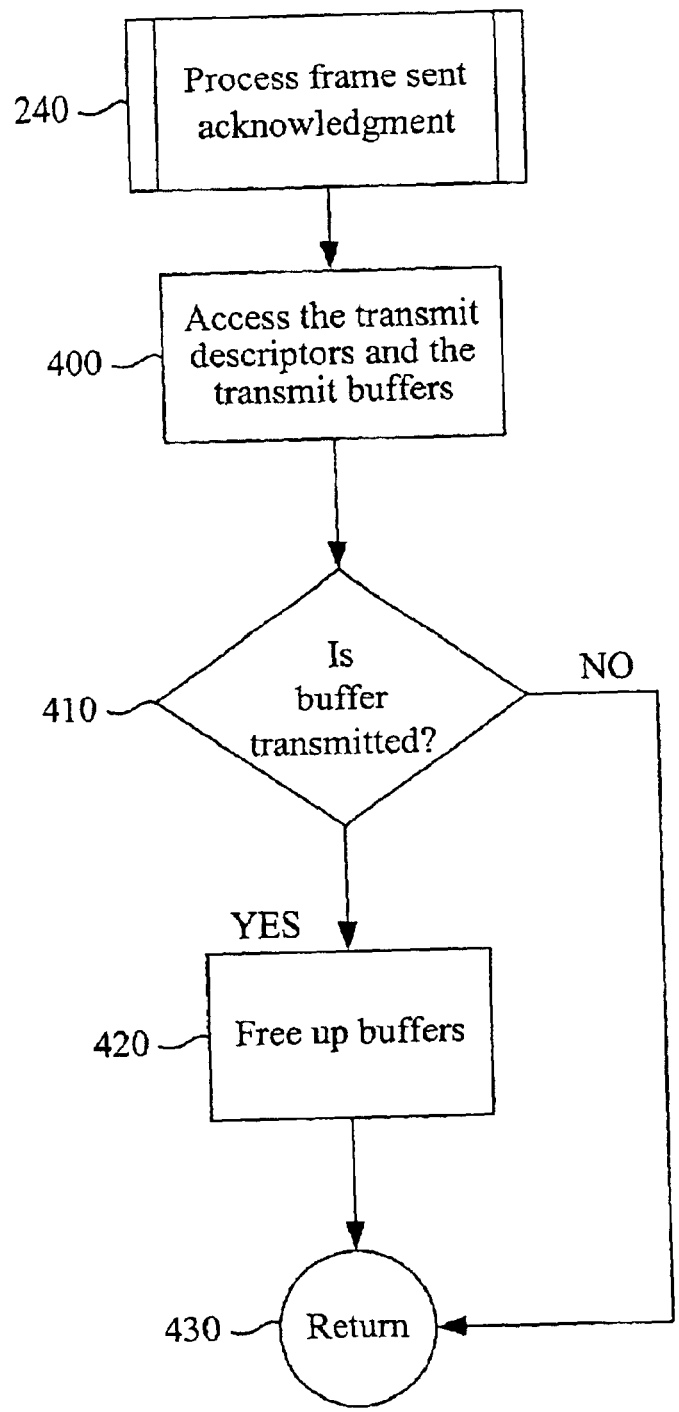
FIG. 5 is a flow diagram illustrating processing acknowledgments of CPU intensive communications protocol frames according to an embodiment of the present invention.

Referring to FIG. 5, the processing of frame sent acknowledgments according to an embodiment of the present invention is illustrated as a high-level flow diagram. Processing frame sent acknowledgments 240 comprises determining if a frame has been transmitted and if so freeing up the associated buffer. Similar to processing received frames, the transmitted frame(s) descriptor(s) and associated buffer(s) 400 are accessed to obtain information regarding the transmitted frame(s). If the contents of the transmitted frame buffer(s) have not been transmitted 410, the processing returns 430 to the look-up and analysis of interrupts as described above. If the contents of the transmitted frame buffer(s) have been transmitted 410, the buffer(s) is freed-up 420 for use by the HDLC or the CPU. The processing then returns 430 to the look-up and analysis of interrupts as described above.

Figure 6:
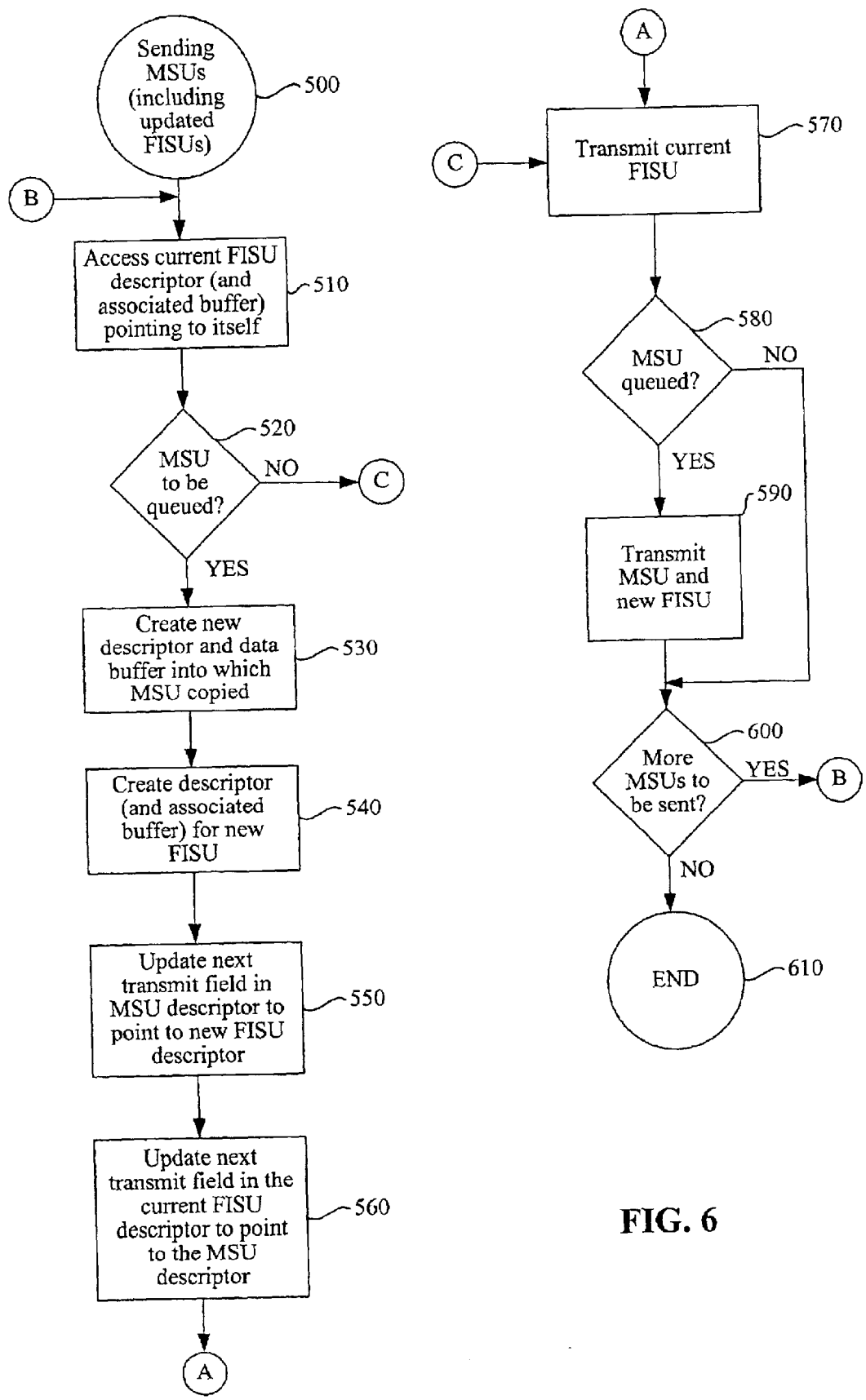
FIG. 6 is a flow diagram illustrating a method for improved processing of the transmission of CPU intensive communications protocol frames according to an embodiment of the present invention.

Referring to FIGS. 6 and 7, the processing of the transmission of CPU intensive communications protocol frames according to an embodiment of the present invention is depicted as a high-level flow diagram. According to this aspect of the invention, FISUs are created and transmitted automatically during idle time i.e. when there is no data to be sent. Referring to FIG. 7, a transmit descriptor array 700 comprises pointers to FISU transmit descriptors (710, 750), to MSU transmit descriptors (730) and to LSSU transmit descriptors (not shown). Such transmit descriptors comprise a number of fields including, but not limited to, a name field, control information fields, pointers to buffers (as described further hereafter), a transmission status field and a next transmit field identifying the frame to be transmitted. As described above, each transmit descriptor points to a respective buffer comprising the relevant frame itself i.e. the FISU transmit descriptors point to respective FISU buffers (720, 760) comprising the FISU frame, the MSU transmit descriptors point to respective MSU buffers (740) comprising the MSU frame and the LSSU transmit descriptors point to respective LSSU buffers (not shown) comprising the LSSU frames. The transmit descriptor array thus provides a table of the frames to be sent out by the HDLC.

Figure 7A:
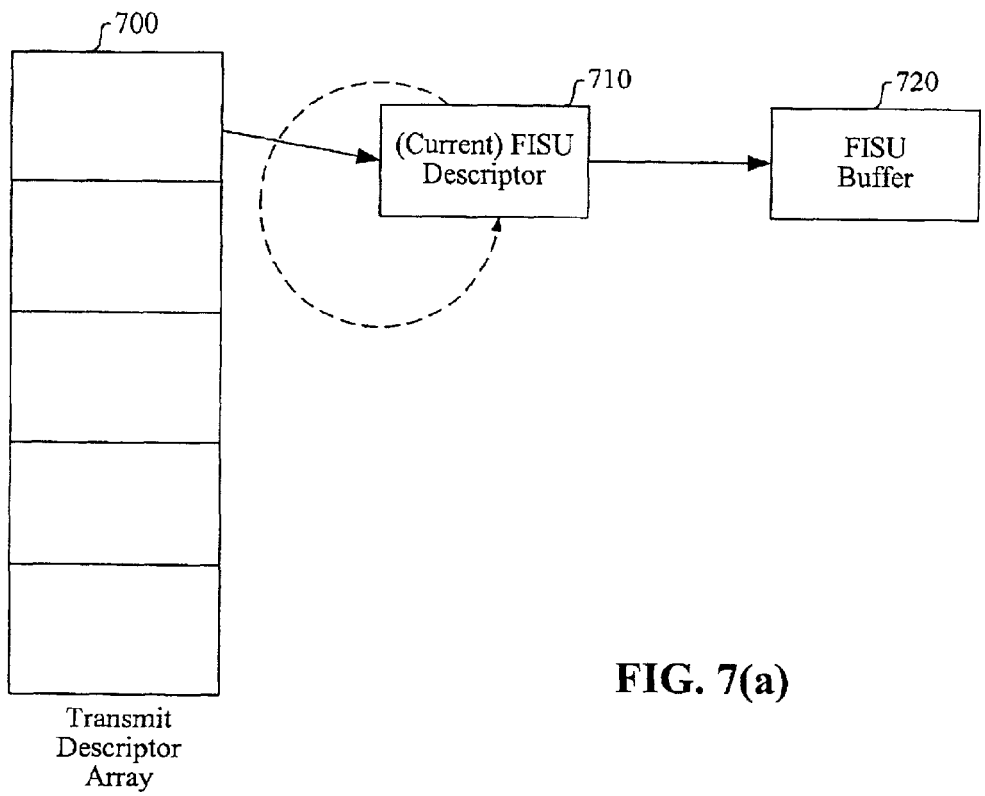
FIGS. 7(a) and (b) are schematics of the handling of the transmit descriptor array, FISU and MSU transmit descriptors and FISU and MSU buffers according to an embodiment of the present invention.

When no MSU is queued for transmission by the CPU, the HDLC loops continuously sending the same FISU frames that each point to itself without intervention from the CPU. Referring particularly to FIGS. 6 and 7(a), whenever no MSU is to be transmitted, a pointer in the transmit descriptor array 700 pointing to a current FISU descriptor, the current FISU descriptor pointing to itself and to the FISU buffer 710, and an associated FISU buffer 720 containing the FISU are accessed 510. A current FISU is simply a FISU about to be sent. If there is no MSU to be queued 520 and no MSU queued 580, the current FISU is transmitted 570 and if more MSUs are to be sent 600 the creation and sending process repeats itself as shown by the dotted arrow. In this manner, the inactive link is filled with FISU frames.

Figure 7B:
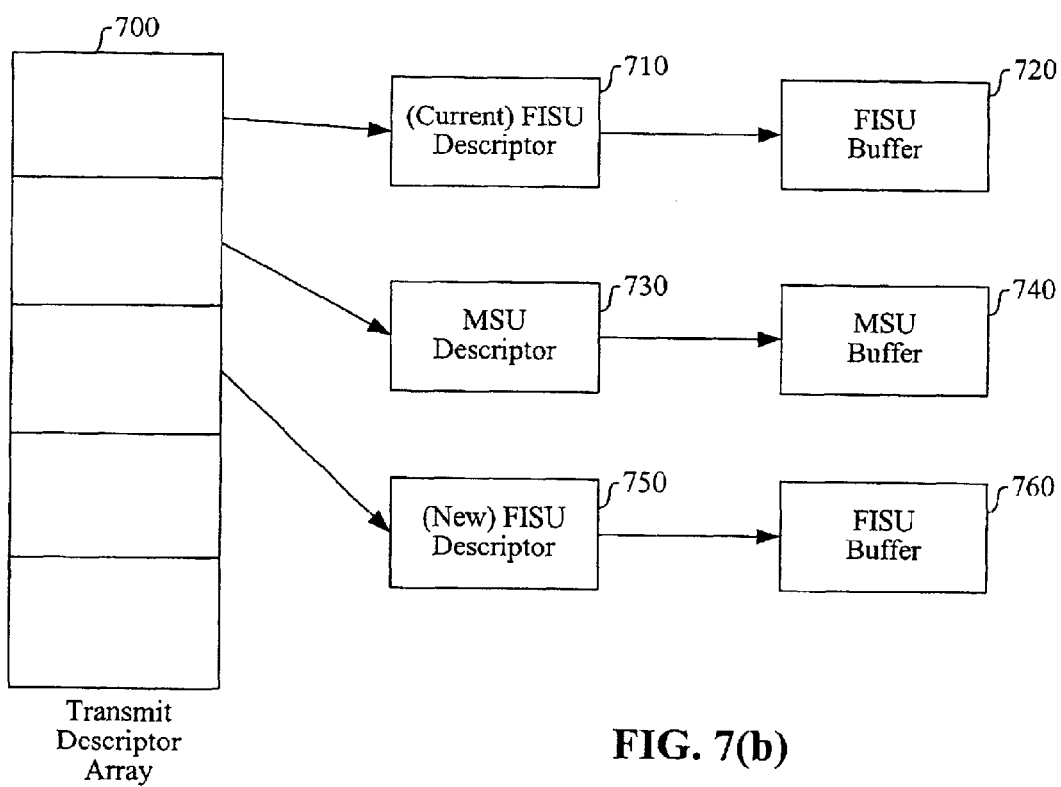

When an MSU is to be queued 520, the CPU creates a new descriptor and a data buffer in the shared RAM into which the contents of the MSU are copied 530. The CPU then creates a descriptor for a new FISU (and associated FISU buffer) 540 and updates the next transmit field in the MSU descriptor to point to the new FISU descriptor 550. Thereafter, the CPU updates the next transmit field in the transmit descriptor of the current FISU about to be transmitted (not the new FISU just created) to point to the newly created MSU descriptor 560. On completion of the transmission of the current FISU 570, the HDLC transmits the MSU and then the new FISU 580, 590. When a next MSU is to be queued for transmission provided more MSUs are to be sent 600, the same procedure as above repeated except the last queued FISU's transmit descriptor, namely a new current FISU, is updated. When no MSU is queued for transmission, the HDLC loops continuously as described above sending FISUs that each point to itself. Referring particularly to FIG. 7(b) in comparison with FIG. 7(a), a transmit descriptor array 700 is filled with pointers to the current FISU transmit descriptor 710, a MSU transmit descriptor 730 and a new FISU descriptor 750, each transmit descriptor pointing to respective FISU, MSU and FISU buffers 720, 740, 760. As described above, the next transmit field in the MSU transmit descriptor is updated to point to the new FISU transmit descriptor as shown by the pointer arrow. Further, the next transmit field in the current FISU transmit descriptor is updated to point to the MSU transmit descriptor also as shown by the pointer arrow. Each of the current FISU, MSU and new FISU are then transmitted pointing to each other respectively. Another current FISU would be created after the transmission of that sequence. If no MSU is to be queued and more MSUs are to be sent, the loop of sending FISUs as described above and shown in FIG. 7(a) would start. If a MSU is to be queued and more MSUs are to be sent, the creation of the MSU, a new FISU and updating of the current FISU descriptor and MSU descriptor would occur as described above and shown in FIG. 7(b).

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or specialized hardware used to implement the present invention is not limiting of the present invention. Thus, the operation and behavior of the embodiments often will be described without specific reference to the actual software code or specialized hardware components. The absence of such specific references is feasible because it is clearly understood that artisans of ordinary skill would be able to design software and hardware to implement the embodiments of the present invention based on the description herein with only a reasonable effort and without undue experimentation.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the present invention described herein; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose. For example, the invention may be implemented as a firmware program loaded into non-volatile storage or a software program loaded from or into a data storage medium as machine-readable code, such code being instructions executable by an array of logic elements such as a microprocessor or other digital signal processing unit.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program. Such an article of manufacture, program storage device or computer program product may include, but is not limited to, CD-ROMs, diskettes, tapes, hard drives, computer system memory (e.g. RAM or ROM) and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, magnetic or optical, or the like, for storing or transmitting signals readable by a machine for controlling the operation of a general or special purpose computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method steps of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While this invention has been described in relation to preferred embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention. Many modifications and variations are possible in light of the above teaching. Thus, it should be understood that the above described embodiments have been provided by way of example rather than as a limitation of the invention and that the specification and drawing(s) are, accordingly, to be regarded in an illustrative rather than a restrictive sense. As such, the present invention is not intended to be limited to the embodiments shown above but rather is to be accorded the widest scope consistent with the principles and novel features disclosed in any fashion herein. The scope of the invention is defined by the appended claims.

What is claimed is:

1. A method of processing a frame of a CPU intensive communications protocol, comprising:

disabling, at a protocol service engine, per frame interrupts from being transmitted to a CPU;

enabling a periodic interrupt handler to interrupt the CPU upon an interrupt period; and upon an interrupt of the periodic interrupt handler, determining and processing a frame received in the interrupt period.

2. The method of claim 1, wherein the interrupt period is 2 ms.

3. A method of processing a frame of a CPU intensive communications protocol, comprising:

disabling per frame interrupts of a CPU;

enabling a periodic interrupt handler to interrupt the CPU upon an interrupt period; and upon an interrupt of the periodic interrupt handler, determining and processing a frame received in the interrupt period, wherein enabling a periodic interrupt handler includes:

setting up an interrupt information area, the interrupt information area comprising information related to the interrupt handler including pointers to buffers where frames are stored;

pre-allocating buffers for receiving a frame; and attaching buffers for receiving a frame in a ring fashion to a communication channel.

4. A method of processing a frame of a CPU intensive communications protocol, comprising:

disabling per frame interrupts of a CPU;

enabling a periodic interrupt handler to interrupt the CPU upon an interrupt period; and upon an interrupt of the periodic interrupt handler, determining and processing a frame received in the interrupt period, wherein determining and processing a frame received in the interrupt period further includes:

if the frame received is a Fill In Signalling Unit (FISU) or Link Status Signalling Unit (LSSU) frame, determining whether there is a change in the FISU or LSSU data from previous FISU or LSSU frames;

if there is a change in the FISU or LSSU data, sending the FISU or LSSU data to a higher layer application; and upon sending the FISU or LSSU data or if there has been no change in the FISU or LSSU data, freeing up a descriptor and a buffer associated with the frame received.

5. The method of claim 4, wherein determining and processing a frame received in the interrupt period further comprises:

if the frame received is not a FISU or LSSU frame, determining if the frame received is a Message Signalling Unit (MSU) frame; and if the frame received is a MSU frame,
  allocating a new buffer,
  attaching a descriptor associated with the frame received to the new buffer,
  freeing up the descriptor, and
  sending the MSU data to a higher layer application.

6. A method of processing a frame of a CPU intensive communications protocol comprising:

disabling per frame interrupts of a CPU;

enabling a periodic interrupt handler to interrupt the CPU upon an interrupt period;

upon an interrupt of the periodic interrupt handler, determining and processing a frame received in the interrupt period, and determining and processing a frame sent acknowledgment stored in the interrupt period.

7. The method of claim 6, wherein determining and processing a frame sent acknowledgment stored in the interrupt period includes if the content of a transmitted frame buffer has been transmitted, freeing up the transmitted frame buffer.

8. A computer program product including computer program code to cause a processor to perform a method of processing a frame of a CPU intensive communications protocol, the method comprising:

disabling, at a protocol service engine, per frame interrupts from being transmitted to a CPU;

enabling a periodic interrupt handler to interrupt the CPU upon an interrupt period; and upon an interrupt of the periodic interrupt handler, determining and processing a frame received in the interrupt period.

9. The computer program product of claim 8, wherein the interrupt period is 2 ms.

10. A computer program including computer program code to cause a processor to perform a method of processing a frame of a CPU intensive communications protocol, the method comprising:

disabling per frame interrupts of a CPU;

enabling a periodic interrupt handler to interrupt the CPU upon an interrupt period; and upon an interrupt of the periodic interrupt handler, determining and processing a frame received in the interrupt period, wherein enabling a periodic interrupt handler includes:

setting up an interrupt information area, the interrupt information area comprising information related to the interrupt handler including pointers to buffers where frames are stored;

pre-allocating buffers for receiving a frame; and attaching buffers for receiving a frame in a ring fashion to a communication channel.

11. A computer program product including computer program code to cause a processor to perform method of processing a frame of a CPU intensive communications protocol, the method comprising:

disabling per frame interrupts of a CPU;

enabling a periodic interrupt handler to interrupt the CPU upon an interrupt period; and upon an interrupt of the periodic interrupt handler, determining and processing a frame received in the interrupt period, wherein determining and processing a frame received in the interrupt period includes:

if the frame received is a Fill In Signaling Unit (FISU) or Link Status Signaling Unit (LSSU) frame, determining whether there is a change in the FISU or LSSU data from previous FISU or LSSU frames;

if there is a change in the FISU or LSSU data, sending the FISU or LSSU data to a higher layer application; and upon sending the FISU or LSSU data or if there has been no change in the FISU or LSSU data, freeing up a descriptor and a buffer associated with the frame received.

12. The computer program product of claim 11, wherein determining and processing a frame received in the interrupt period further comprises:

if the frame received is not a FISU or LSSU frame, determining if the frame received is a Message Signaling Unit (MSU) frame; and if the frame received is a MSU frame,
  allocating a new buffer,
  attaching a descriptor associated with the frame received to the new buffer,
  freeing up the descriptor, and
  sending the MSU data to a higher layer application.

13. A computer program product including computer program code to cause a processor to perform method of processing a frame of a CPU intensive communications protocol, the method comprising:

disabling per frame interrupts of a CPU;

enabling a periodic interrupt handler to interrupt the CPU upon an interrupt period; and upon an interrupt of the periodic interrupt handler, determining and processing a frame received in the interrupt period, including upon an interrupt of the periodic interrupt handler, determining and processing a frame sent acknowledgment stored in the interrupt period.

14. The computer program product of claim 13, wherein determining and processing a frame sent acknowledgment stored in the interrupt period includes if the content of a transmitted frame buffer has been transmitted, freeing up the transmitted frame buffer.

* * * * *